(12) United States Patent
Watanabe et al.

(10) Patent No.: US 7,687,762 B2
(45) Date of Patent: Mar. 30, 2010

(54) MONITORING DEVICE, LIGHT SOURCE DEVICE, OPTICAL SCANNING DEVICE, AND IMAGE FORMING APPARATUS HAVING AN APERTURE MEMBER FOR SHAPING A BEAM DIAMETER OF A MONITORING LIGHT BEAM

(75) Inventors: Naoto Watanabe, Kanagawa (JP); Daisuke Ichii, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 44 days.

(21) Appl. No.: 12/186,808

(22) Filed: Aug. 6, 2008

(65) Prior Publication Data

US 2009/0065685 A1      Mar. 12, 2009

(30) Foreign Application Priority Data

Sep. 10, 2007     (JP)     ............................. 2007-233483

(51) Int. Cl.
  *H01J 3/14* (2006.01)
(52) U.S. Cl. ....................................... 250/216; 250/205
(58) Field of Classification Search ................. 250/216, 250/205, 239, 237 R, 208.1, 201.2–201.5; 359/196–219; 369/44.32–44.41, 112.05–112.07, 369/118
See application file for complete search history.

(56) References Cited

U.S. PATENT DOCUMENTS

| | | | |
|---|---|---|---|
| 6,927,924 B2 * | 8/2005 | Ueyama | ...................... 359/738 |
| 7,218,432 B2 | 5/2007 | Ichii et al. | |
| 2007/0211324 A1 | 9/2007 | Sakai et al. | |
| 2007/0211325 A1 | 9/2007 | Ichii | |
| 2007/0253047 A1 | 11/2007 | Ichii et al. | |
| 2007/0253048 A1 | 11/2007 | Sakai et al. | |
| 2008/0024849 A1 | 1/2008 | Hayashi et al. | |
| 2008/0025759 A1 | 1/2008 | Ichii et al. | |
| 2008/0055672 A1 | 3/2008 | Watanabe et al. | |
| 2008/0055692 A1 | 3/2008 | Saisho et al. | |
| 2008/0068690 A1 | 3/2008 | Ichii | |
| 2008/0068693 A1 | 3/2008 | Hayashi et al. | |

(Continued)

FOREIGN PATENT DOCUMENTS

JP     2005-156933     6/2005

(Continued)

OTHER PUBLICATIONS

U.S. Appl. No. 12/021,850, filed Jan. 29, 2008, Naoto Watanabe et al.

(Continued)

*Primary Examiner*—Que T Le
(74) *Attorney, Agent, or Firm*—Oblon, Spivak, McClelland, Maier & Neustadt, L.L.P.

(57) ABSTRACT

A monitoring device includes a first aperture plate, a second aperture plate, and a photodiode. The first aperture is disposed in a light path of a light beam emitted by a light source and includes a first aperture arranged such that a portion of the light beam having maximum light intensity passes and a reflecting portion that reflects the light beam as a monitoring light beam. The second aperture plate is disposed in a light path of the monitoring light beam and includes a second aperture that shapes a beam diameter of the monitoring light beam. The photodiode receives the monitoring light beam.

16 Claims, 12 Drawing Sheets

U.S. PATENT DOCUMENTS

2008/0100895 A1 5/2008 Hayashi et al.
2008/0123159 A1 5/2008 Hayashi et al.

FOREIGN PATENT DOCUMENTS

| JP | 2006-91157 | 4/2006 |
|----|------------|--------|
| JP | 2006-259098 | 9/2006 |
| JP | 2007-298563 | 11/2007 |

OTHER PUBLICATIONS

U.S. Appl. No. 12/024,505, filed Feb. 1, 2008, Naoto Watanabe et al.
U.S. Appl. No. 11/771,275, filed Jun. 29, 2007, Daisuke Ichii.
U.S. Appl. No. 12/031,362, filed Feb. 14, 2008, Nobuyuki Arai et al.
U.S. Appl. No. 12/025,343, filed Feb. 4, 2008, Naoki Miyatake et al.

* cited by examiner

MONITORING DEVICE, LIGHT SOURCE DEVICE, OPTICAL SCANNING DEVICE, AND IMAGE FORMING APPARATUS HAVING AN APERTURE MEMBER FOR SHAPING A BEAM DIAMETER OF A MONITORING LIGHT BEAM

CROSS-REFERENCE TO RELATED APPLICATIONS

The present application claims priority to and incorporates by reference the entire contents of Japanese priority document 2007-233483 filed in Japan on Sep. 10, 2007.

BACKGROUND OF THE INVENTION

1. Field of the Invention

The present invention relates to a technology for monitoring intensity of a light beam emitted by a light source.

2. Description of the Related Art

Image forming apparatuses capable of performing electrophotographic image recording by using lasers are widely used. Such an image forming apparatus is generally provided with an optical scanning device in which a light beam emitted by a light source is deflected by a deflector (for example, a polygon mirror) to scan the surface of a rotating photosensitive drum in an axial direction, so that a latent image is formed on the photosensitive drum.

However, intensity of the scanning light beam varies with variations in an ambient temperature and aging of the image forming apparatus, causing an image to have uneven density. To prevent such uneven density, the optical scanning devices are generally provided with what is known as auto power control (APC). The APC monitors a portion of the light beam that is emitted by the light source and detected by a light detector such as a photodiode, and controls the output level of a light beam from the light source based on the outcome of the photodiode.

For example, Japanese Patent Application Laid-open No. 2006-91157 discloses an optical scanner that includes a light source, a splitting member, an optical deflecting unit, a second aperture, an optical sensor, a control unit, and a first aperture. The splitting member splits a light beam emitted by the light source into a scanning light beam and a feedback light beam. The optical deflecting unit deflects the scanning light beam and causes the scanning light beam to scan a scanning surface. The second aperture is arranged between the splitting member and the optical deflecting unit and includes a second opening that shapes a cross section of the scanning light beam. The optical sensor receives the feedback light beam and detects the intensity of the feedback light beam. The control unit controls the intensity of the light beam emitted by the light source based on the intensity detected by the optical sensor. The first aperture is arranged between the light source and the optical sensor, and includes a first opening that is larger than the second opening and shapes the cross section of the light beam.

Furthermore, Japanese Patent Application Laid-open No. 2005-156933 discloses an optical scanner that includes an optical system and an intensity control unit. The optical system includes a detecting unit that detects the intensity of an incident light beam and a light splitting unit that splits a portion of the light beam emitted by a light source into a monitoring beam, so that the monitoring beam is made incident on a detecting unit. The intensity control unit controls the intensity of the light beam output by the light source to be of predetermined value. The salient feature of this optical scanner is that if the direction of deflection of the light beam emitted by the light source changes, the optical system performs adjustments so that a rate of change of the intensity on a scanning surface substantially matches with a rate of change of the intensity made incident on the detecting unit.

Moreover, Japanese Patent Application Laid-open No. 2006-259098 discloses an optical scanner that includes a surface emitting laser device, an aperture, a collimator lens, a light deflector, a beam splitting unit, and a light-receiving element. A laser beam emitted by the surface emitting laser device is shaped by the aperture and collimated by the collimator lens. Then, the laser beam is deflected by the light deflector to scan a scanning surface. At the same time, a part of the laser beam is split into a monitoring beam by the beam splitting unit and reflected so that the light-receiving element detects intensity of a reflected light beam. The salient feature of this optical scanner is that the light-receiving element is provided on the same circuit board as the surface light-emitting laser device.

However, an actual angle of divergence of the light beam emitted by the light source usually differs from the angle of divergence at the time of design due to factors such as manufacturing variations in the light sources or rise in temperature in a running optical scanner. Therefore, the intensity variation of the scanning light beam may not be the same as the intensity variation of the monitoring light beam. Thus, accuracy of APC in the optical scanners may be degraded in the technologies described above.

SUMMARY OF THE INVENTION

It is an object of the present invention to at least partially solve the problems in the conventional technology.

According to an aspect of the present invention, there is provided a monitoring device that monitors intensity of a light beam emitted by a light source and includes an optical element having a first aperture arranged such that a first portion of the light beam having maximum intensity passes through a substantial center of the first aperture, and a reflecting portion arranged around the first aperture such that the reflecting portion reflects a second portion of the light beam as a monitoring light beam to be monitored; an aperture member having a second aperture that shapes a beam diameter of the monitoring light beam; and a light-receiving element that receives the monitoring light beam coming through the second aperture.

According to another aspect of the present invention, there is provided a light source device that includes a light source; and the above monitoring device.

According to still another aspect of the present invention, there is provided an optical scanning device that scans a scanning surface with a light beam and includes the above light source; a deflector that deflects a light beam emitted by the light source device; and a scanning optical system that condenses a light beam deflected by the deflector on the scanning surface.

According to still another aspect of the present invention, there is provided an image forming apparatus that includes at least one image carrying member; and at least one of the above optical scanning devices, wherein the scanning device scans the image carrying member with a light beam based on image data.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
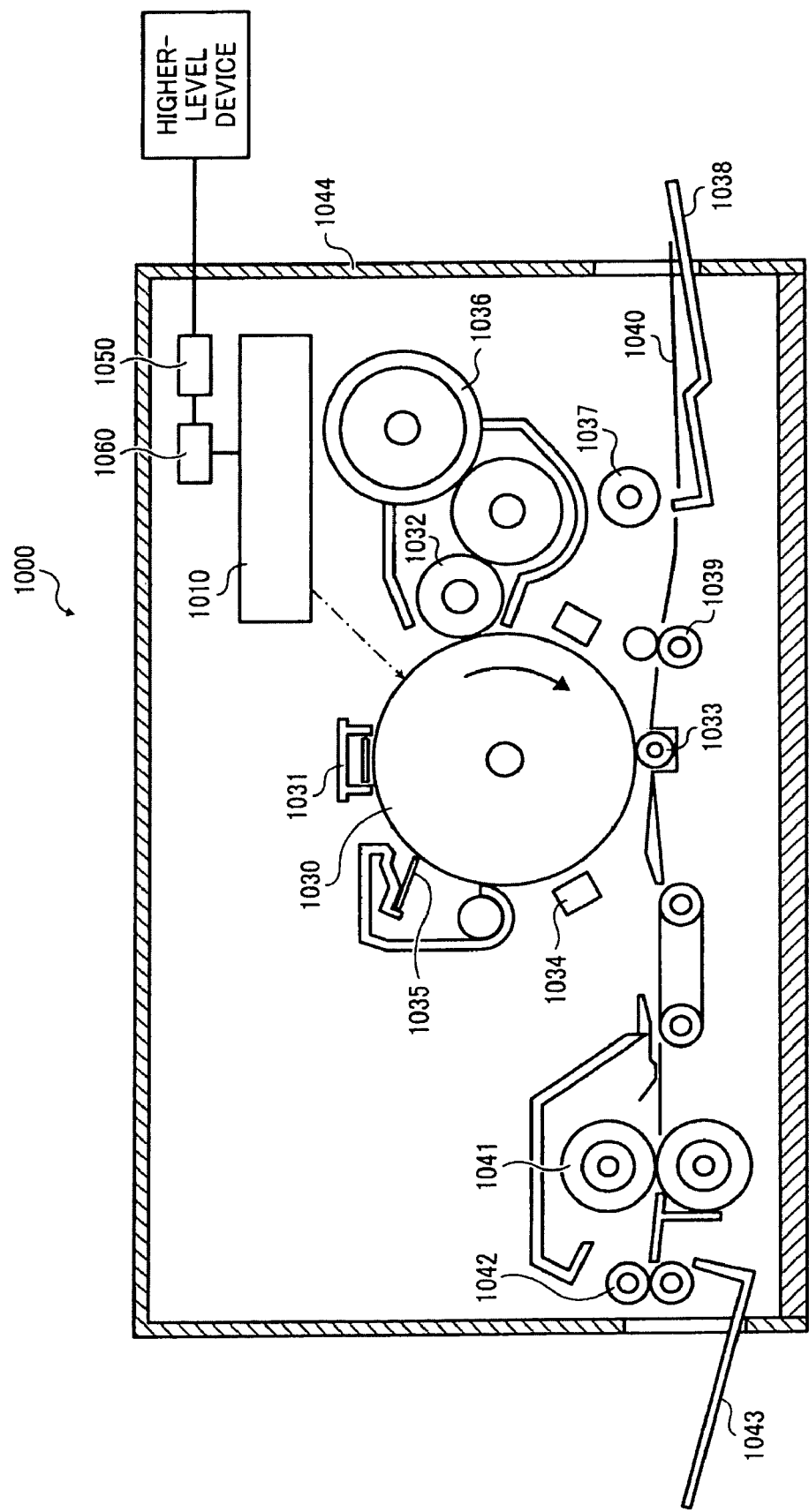
FIG. 1 is a schematic diagram of a laser printer according to a first embodiment of the present invention.

Exemplary embodiments of the present invention are described below with reference to the accompanying drawings. A first embodiment of the present invention is described with reference to FIGS. 1 to 15. FIG. 1 is a schematic diagram of a laser printer 1000 serving as an image forming apparatus according to the first embodiment.

The laser printer 1000 includes an optical scanning device 1010, a photosensitive drum 1030, an electrostatic charger 1031, a developing roller 1032, a transfer charger 1033, a neutralizing unit 1034, a cleaning blade 1035, a toner cartridge 1036, a paper feeding roller 1037, a paper feeding tray 1038, a pair of registration rollers 1039, a fixing roller 1041, a paper discharge roller 1042, a paper discharge tray 1043, a communication control device 1050, and a printer control device 1060 that controls all the parts mentioned above. Each of the parts is arranged at a predetermined position inside a printer casing 1044.

The communication control device 1050 controls a two-way communication between the laser printer 1000 and an external device over a network.

The photosensitive drum 1030 is a cylindrical member having a photosensitive layer on its surface. In other words, the surface of the photosensitive drum 1030 serves as a scanning surface. The photosensitive drum 1030 rotates in the direction of an arrow shown in FIG. 1.

The electrostatic charger 1031, the developing roller 1032, the transfer charger 1033, the neutralizing unit 1034, and the cleaning blade 1035 are disposed in the vicinity of the surface of the photosensitive drum 1030 in the mentioned order along the rotation direction of the photosensitive drum 1030.

The electrostatic charger 1031 uniformly charges the surface of the photosensitive drum 1030.

The optical scanning device 1010 illuminates the surface of the photosensitive drum 1030 charged by the electrostatic charger 1031 with a light beam modulated based on image data from a higher-level device (such as a personal computer). As a result, a latent image of the image data is formed on the surface of the photosensitive drum 1030. As the photosensitive drum 1030 rotates, the latent image moves toward the developing roller 1032. The structure of the optical scanning device 1010 is described later.

The toner cartridge 1036 contains toners to be supplied to the developing roller 1032.

The developing roller 1032 causes the toners supplied from the toner cartridge 1036 to adhere to the latent image formed on the surface of the photosensitive drum 1030. As a result, a toner image that is the latent image developed with the toners is formed. As the photosensitive drum 1030 continues to rotate, the toner image moves toward the transfer charger 1033.

The paper feeding tray 1038 contains sheets of recording paper 1040. The paper feeding roller 1037 is disposed in the vicinity of the paper feeding tray 1038 and picks out a single sheet of the recording paper 1040 at a time from the paper feeding tray 1038 and transports it to the registration rollers 1039. The registration rollers 1039 temporarily holds the recording paper 1040 and forwards the recording paper 1040 toward a gap between the photosensitive drum 1030 and the transfer charger 1033 in synchronization with the rotation of the photosensitive drum 1030.

A voltage of opposite polarity to the toners is applied to the transfer charger 1033 so that the recording paper 1040 attracts the toners adhering to the surface of the photosensitive drum 1030. As a result, the toner image is transferred to the recording sheet 1040. The recording paper 1040 with the toner image is forwarded to the fixing roller 1041.

The fixing roller 1041 applies heat and pressure to the recording paper 1040 and thereby fixes the toner image on the recording paper 1040. The paper discharge roller 1042 then forwards the recording paper 1040 having the fixed toner image to the paper discharge tray 1043 to be stacked therein.

The neutralizing unit 1034 neutralizes the surface of the photosensitive drum 1030.

The cleaning blade 1035 removes the toner (residual toner) remained on the surface of the photosensitive drum 1030. The residual toner removed by the cleaning blade is to be reused. After the surface of the photosensitive drum 1030 is cleaned, the photosensitive drum 1030 again faces the electrostatic charger 1031.

The structure of the optical scanning device 1010 is described below.

Figure 2:
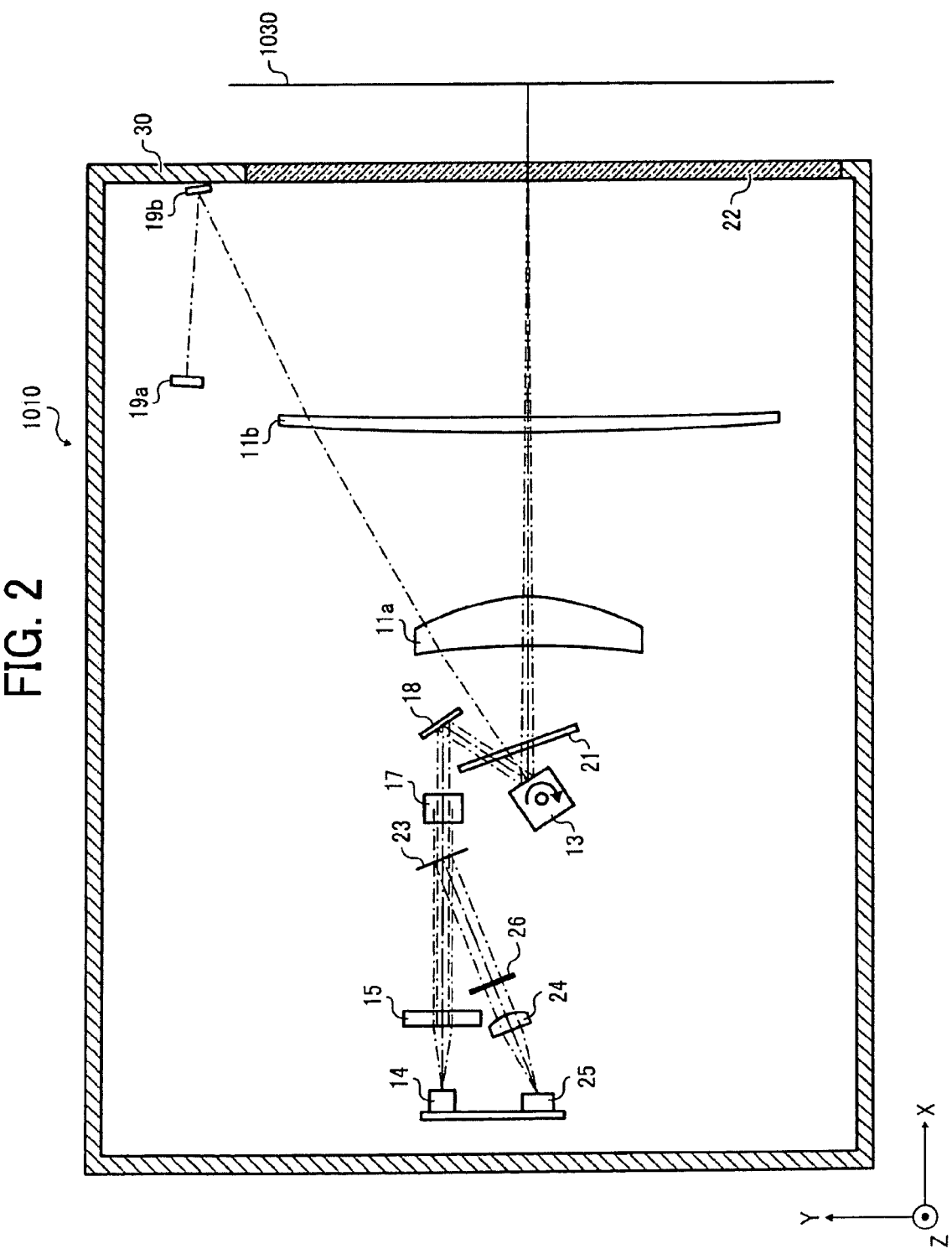
FIG. 2 is a schematic diagram of an optical scanning device shown in FIG. 1.

FIG. 2 is a schematic diagram of the optical scanning device 1010. The optical scanning device 1010 includes a light source 14, a coupling lens 15, a first aperture plate 23, a cylindrical lens 17, a reflective mirror 18, a polygon mirror 13, a deflector-side scanning lens 11a, an image-side scanning lens 11b, a synchronous sensor 19a, a synchronous mirror 19b, a second aperture plate 26, an imaging lens 24, a photodiode 25, and a scan control device 20 (not shown in FIG. 2 but shown in FIG. 19). All the parts mentioned above are assembled at predetermined places inside a housing 30. In the description below and the related drawings, a longitudinal direction of the photosensitive drum 1030 represents the Y-axis and a direction of the optical axes of the deflector-side scanning lens 11a and the image-side scanning lens 11b represents the X-axis of the three-dimensional coordinate system (X, Y, Z).

Figure 3:
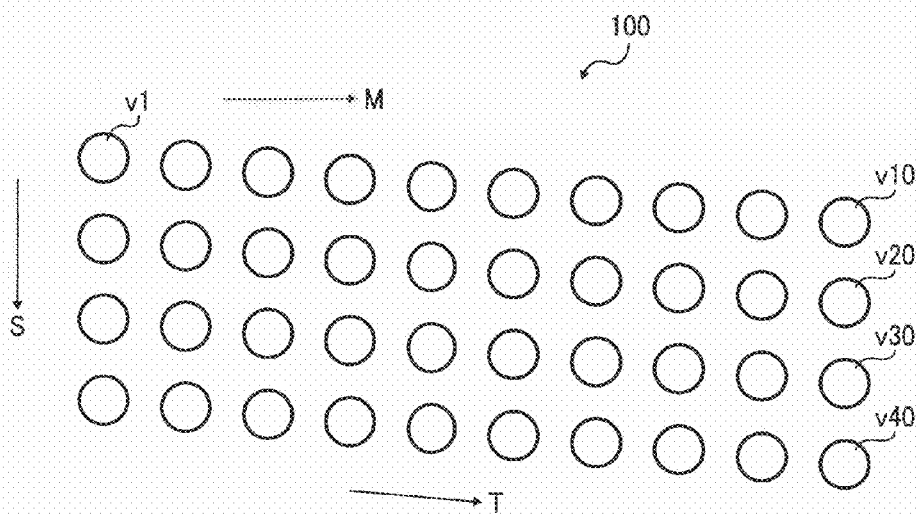
FIG. 3 is a schematic diagram of a two-dimensional array of a vertical cavity surface emitting laser (VCSEL) included in a light source shown in FIG. 2.

FIG. 3 is a schematic diagram of the light source 14. The light source 14 includes a two-dimensional array 100 containing 40 light-emitting units arranged on a single board. In FIG. 3, M direction corresponds to a main-scanning direction (and is the same as the Y-axis), S direction corresponds to a sub-scanning direction (and is the same as the Z-axis), and T direction corresponds to a direction that forms an angle $\alpha°$ (where $0°<\alpha°<90°$) from M direction to S direction.

In the two-dimensional array 100, four rows of ten light-emitting units are arranged at regular intervals in T direction. The four rows are arranged at regular intervals along S direction. In other words, the 40 light-emitting units are two-dimensionally arranged along T and S directions. For the sake of convenience, the rows of the light-emitting units from the top of the drawing to the bottom of the drawing are sequentially numbered first light-emitting unit row, second light-emitting unit row, third light-emitting unit row, and fourth light-emitting unit row. In the description, the term inter-light-emitting unit gap refers to a distance between the centers of two neighboring light-emitting units.

As shown in FIG. 3, the light-emitting units in the first row are assigned reference symbols v1 to v10 from left to right, the light-emitting units in the second row are assigned reference symbols v11 to v20 from left to right, the light-emitting units in the third row are assigned reference symbols v21 to v30, and the light-emitting units in the fourth row are assigned reference symbols v31 to v40.

Each of the light-emitting units is a vertical resonator type surface light-emitting laser device (vertical cavity surface emitting laser (VCSEL)) of a 780-nanometer bandwidth. In other words, the two-dimensional array 100 is a surface light-emitting laser array consisting of 40 light-emitting units.

The length of the two-dimensional array 100 along M direction is 0.3 millimeter.

Returning to FIG. 2, the coupling lens 15 converts the light beam emitted by the light source 14 into a substantially parallel beam. The coupling lens 15 has a focal distance of 27 millimeters.

Figure 4A:
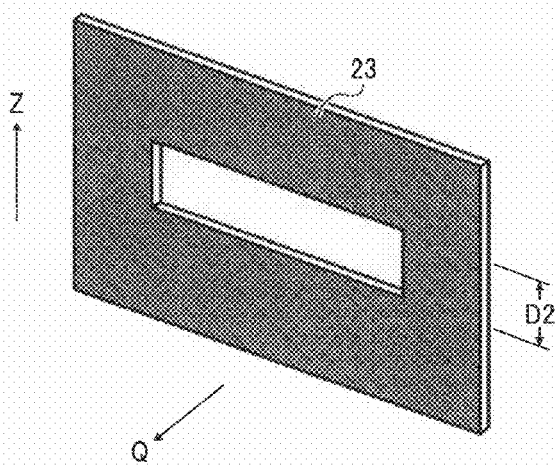
FIGS. 4A and 4B are schematic diagrams for explaining a first aperture plate shown in FIG. 2.
Figure 4B:
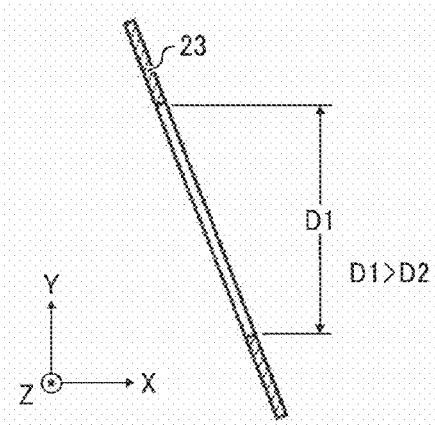

FIGS. 4A and 4B are schematic diagrams of the first aperture plate 23. As shown in FIG. 4A, the first aperture plate 23 has a first aperture, and shapes the beam diameter of the light beam coming through the coupling lens 15. The first aperture plate 23 is disposed in such a fashion that a portion of the light beam having maximum intensity passes through a substantial center of the first aperture. A reflective material is used in a reflecting portion around the first aperture.

To use the light beam reflected by the reflecting portion around the first aperture as a monitoring light beam, the first aperture plate 23 is disposed at an angle to an imaginary plane that is perpendicular to a traveling direction of the light beam coming through the coupling lens 15. In other words, the first aperture plate 23 allows a high-intensity central portion of the light beam emitted by the light source 14 to go through, and reflects back (splits) a low-intensity peripheral portion of the light beam as a monitoring light beam. The travelling direction of the monitoring light beam reflected back by the first aperture plate 23 is supposed as Q direction for the sake of convenience.

As shown in FIGS. 4A and 4B, a length D2 of the first aperture of the first aperture plate 23 in the sub-scanning direction (corresponding to the Z direction) is 1.28 millimeters and a length D1 in the main-scanning direction (corresponding to the Y direction) is 5.8 millimeters. In other words, D1 is longer than D2. FIG. 4B is an XY cross-sectional view of the first aperture plate 23 through the center of the first aperture.

Returning to FIG. 2, the cylindrical lens 17 directs the light beam coming through the first aperture of the first aperture plate 23 to the reflective mirror 18 so that the light beam is focused in the direction corresponding to the sub-scanning direction (in Z direction in this example) in the vicinity of a reflective surface of the polygon mirror 13.

An optical system disposed in a light path between the light source 14 and the polygon mirror 13 is called a pre-deflector optical system, and includes the coupling lens 15, the first aperture plate 23, the cylindrical lens 17, and the reflective mirror 18.

Between the reflective mirror 18 and the polygon mirror 13, and between the polygon mirror 13 and the deflector-side scanning lens 11a are disposed a sound-proof glass 21 each.

The polygon mirror 13 is a tetragonal mirror with an inscribed radius of 7 millimeters, with each surface being a deflective reflective surface. The polygon mirror 13 rotates at a constant speed about an axis parallel to the direction corresponding to the sub-scanning direction (Z direction in this example) and deflects the light beam from the reflective mirror 18.

The deflector-side scanning lens 11a is disposed in the light path of the light beam deflected by the polygon mirror 13.

The image-side scanning lens 11b is disposed in a light path of the light beam coming through the deflector-side scanning lens 11a.

An optical system disposed in a light path between the polygon mirror 13 and the photosensitive drum 1030 is called a scanning optical system, and includes the deflector-side scanning lens 11a and the image-side scanning lens 11b.

The light beam deflected by the polygon mirror 13 is converged as a light spot on the surface of the photosensitive drum 1030 by the scanning optical system. As the polygon mirror 13 rotates, the light spot on the surface of the photosensitive drum shifts along Y direction.

Of the light beam deflected by the polygon mirror 13 and coming through the scanning optical system, a portion of the light beam that is not used for image formation passes through the synchronous mirror 19b and is directed toward the synchronous sensor 19a as a synchronous light beam. The synchronous sensor 19a outputs signals (photoelectric conversion signals) proportionate to the intensity of the received light beam.

A dust-proof glass 22 (see FIG. 2) is disposed between the image-side scanning lens 11b and the photosensitive drum 1030.

Figure 5:
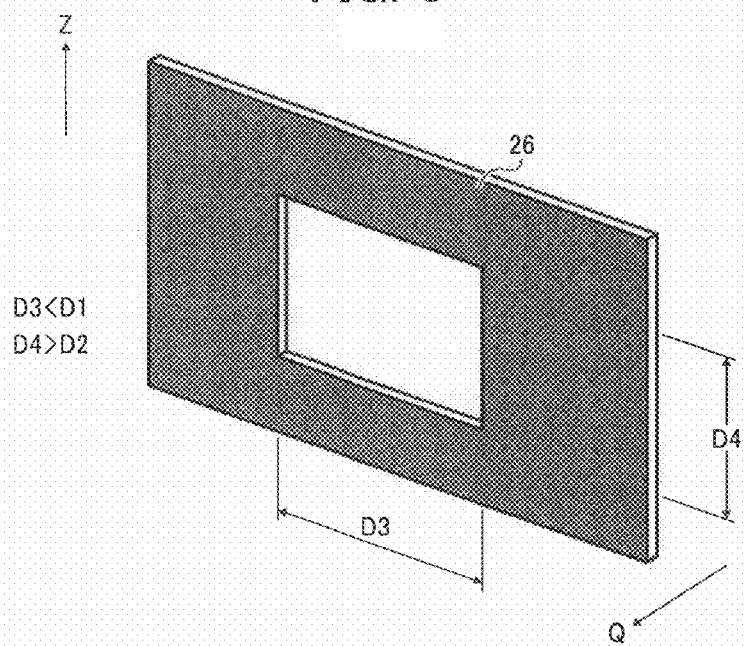
FIG. 5 is a schematic diagram of a second aperture plate shown in FIG. 2.

The second aperture plate 26 is disposed in a light path of the monitoring light beam reflected by the first aperture plate 23. FIG. 5 is a schematic diagram of the second aperture plate 26. The second aperture plate 26 has a second aperture that shapes a beam diameter of the monitoring light beam.

The second aperture plate 26 is disposed optically in the vicinity of a focal point of the coupling lens 15, so that if there are multiple monitoring light beams, principal rays of each light beam converge at the second aperture of the second aperture plate 26 and are shaped uniformly.

A length D4 of the second aperture of the second aperture plate 26 in the sub-scanning direction (corresponding to Z direction in this example) is 3.25 millimeters and a length D3 in the direction perpendicular to Z direction is 3.8 millimeters. In other words, D3 is shorter than D1, and D4 is longer than D2.

Figure 6A:
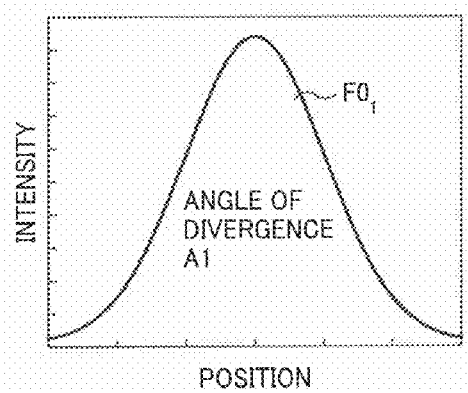
FIG. 6A is a graph of intensity distribution when an angle of divergence of a light beam emitted by a light-emitting unit is A1.
Figure 6B:
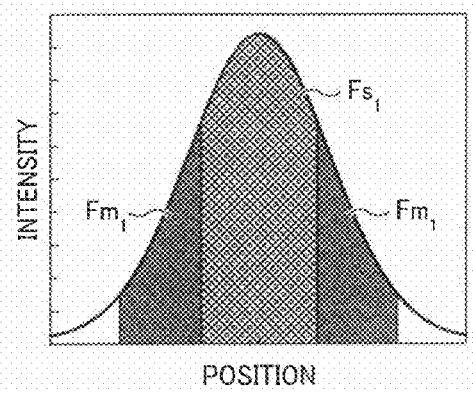
FIG. 6B is a graph for explaining what portion of the light beam passes through what aperture when the angle of divergence of the light beam is A1.

For example, assuming, as shown in FIG. 6A, that a light beam $F0_1$ having an angle of divergence of A1 is output. An outcome is, as shown in FIG. 6B, that the light beam in an area $Fs_1$ of the light beam $F0_1$ passes through the first aperture of the first aperture plate 23 and the light beam in an area $Fm_1$ passes through the second aperture of the second aperture plate 26.

Figure 7A:
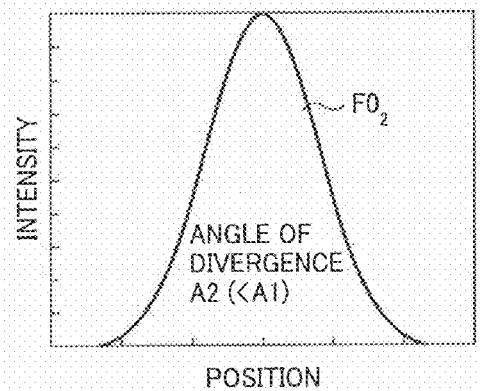
FIG. 7A is a graph of the intensity distribution when the angle of divergence of the light beam emitted by the light-emitting unit is A2 (where A2<A1).
Figure 7B:
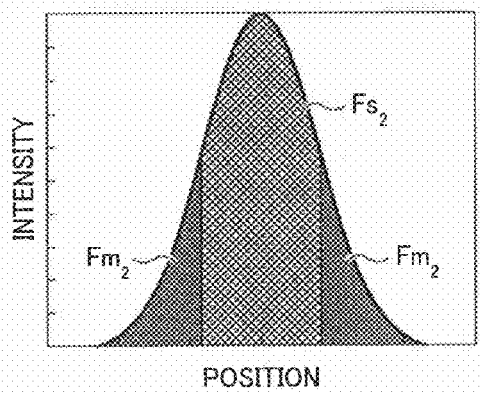
FIG. 7B is a graph for explaining what portion of the light beam passes through what aperture when the angle of divergence of the light beam is A2.

Furthermore, assuming, as shown in FIG. 7A, that a light beam $F0_2$ having an angle of divergence of A2 (where A2<A1) and having intensity distribution such that the central portion has a steeper peak as compared to the light beam $F0_1$ is output. An outcome is, as shown in FIG. 7B, that the light beam in an area $Fs_2$ of the light beam $F0_2$ passes through the first aperture of the first aperture plate 23, and the light beam in an area $Fm_2$ passes through the second aperture of the second aperture plate 26.

Figure 8A:
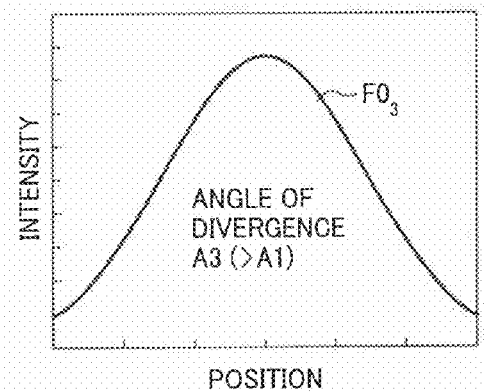
FIG. 8A is a graph of the intensity distribution when the angle of divergence of the light beam emitted by the light-emitting unit is A3 (where A3>A1)
Figure 8B:
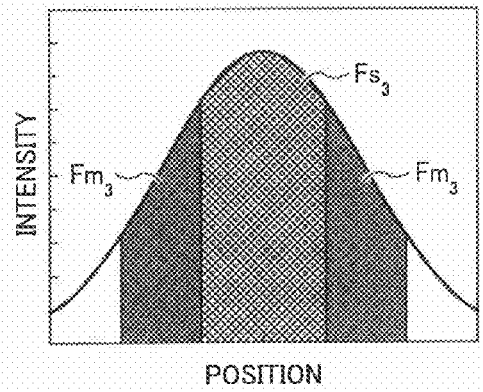
FIG. 8B is a graph for explaining what portion of the light beam passes through what aperture when the angle of divergence of the light beam is A3.

Moreover, assuming, as shown in FIG. 8A, that a light beam $F0_3$ having an angle of divergence of A3 (where A3>A1) and having intensity distribution such that the intensity weakens gradually from the center towards the periphery as compared to the light beam $F0_1$ is output. An outcome is, as shown in FIG. 8B, that the light beam in an area $Fs_3$ passes through the first aperture of the first aperture plate 23, and the light beam in an area $Fm_3$ passes through the second aperture of the second aperture plate 26.

Figure 9:
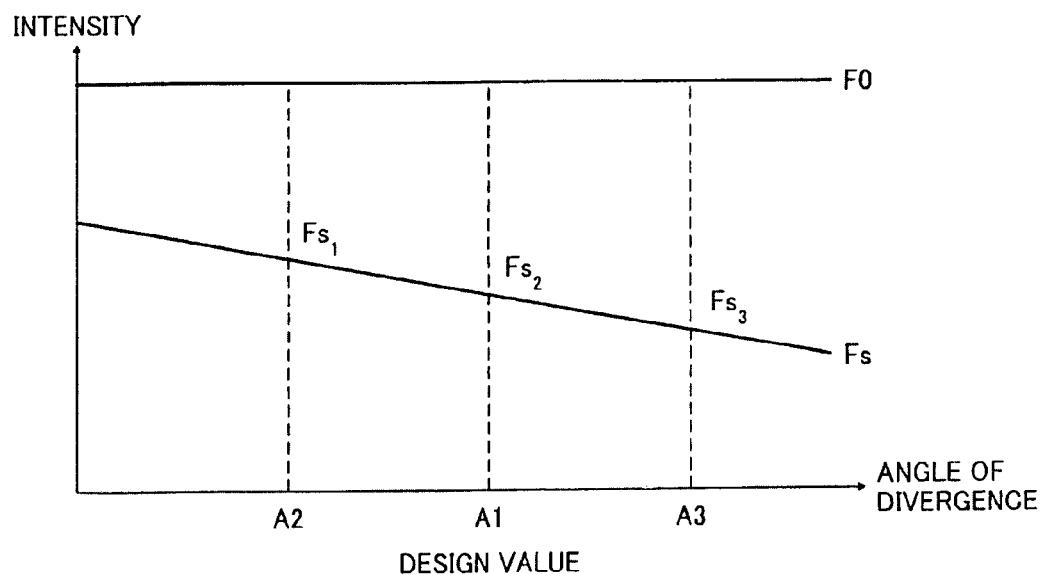
FIG. 9 is a graph of a relation between the angle of divergence and intensity of the light beam that passes through a first aperture of the first aperture plate when intensity of a light beam emitted by the light source is constant.

Thus, as shown in FIG. 9, with the increase in the angle of divergence of the light beam (light beam F0, for example) output by the light source 14, there is a decrease in the intensity of the light beam passing through the first aperture of the first aperture plate 23 (light beam Fs, for example). In the above examples, it is supposed that the intensity of the light beam F0 remains constant even if the angle of divergence varies.

Figure 10:
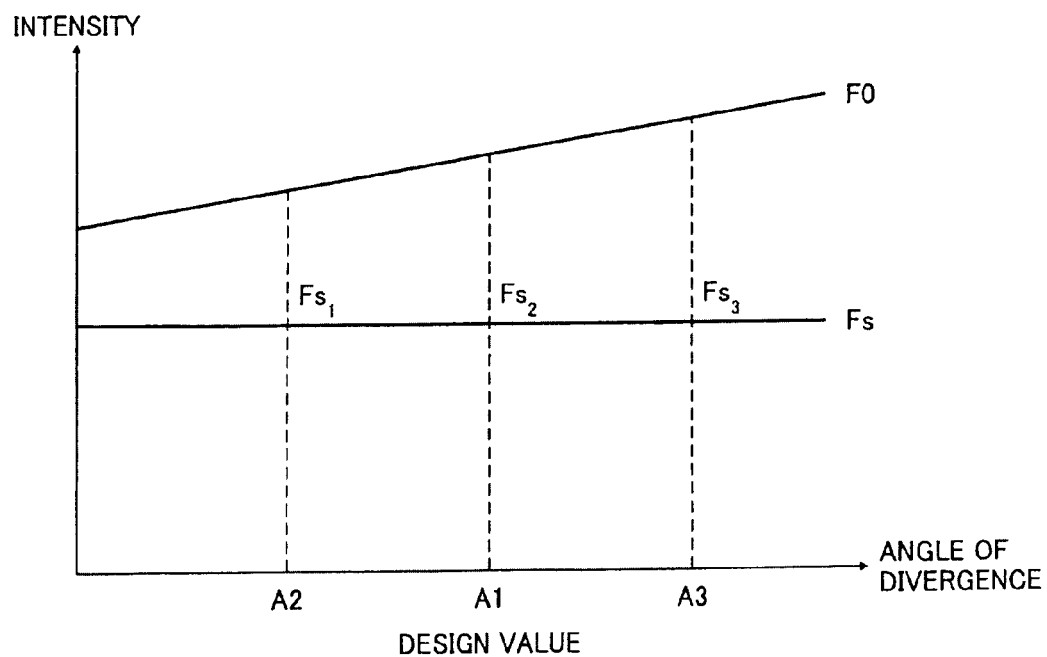
FIG. 10 is a graph of a relation between the angle of divergence and intensity of the light beam emitted by the light source when intensity of a light beam that passes through the first aperture is constant.

Therefore, as shown in FIG. 10, to keep the light beam Fs constant, the intensity of the light beam F0 has to be increased if the angle of divergence of the light beam F0 is greater than the angle of divergence at the time of design (A1, for example), and decreased if the angle of divergence of the light beam F0 is smaller than the angle of divergence at the time of design.

Figure 11:
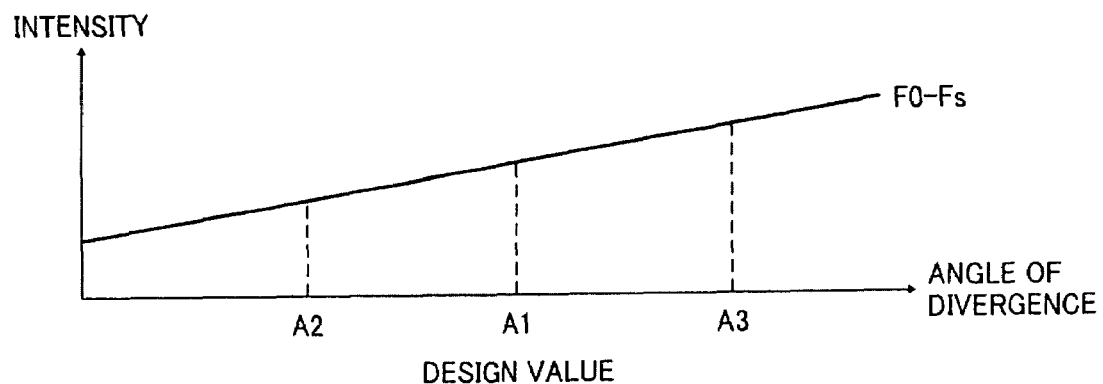
FIG. 11 is a graph of a relation between intensity of a light beam reflected by the first aperture plate and the angle of divergence.

As shown in FIG. 11, the intensity of the light beam reflected by the first aperture plate 23 (light beam F0-Fs, for example) increases with the increase in the angle of divergence of the light beam F0.

Suppose that the second aperture plate 26 is not arranged and the light beam F0-Fs is directly received by the photodiode 25, as is the case in the conventional optical scanner. When auto power control (APC) takes over, and if the angle of divergence of the light beam F0 is A3, APC exerts control to further reduce the intensity of the light beam F0. If the angle of divergence of the light beam F0 is A2, APC exerts control to further increase the intensity of the light beam F0. Thus, the intensity of the light beam Fs fluctuates, resulting in reduced accuracy of APC.

Figure 12:
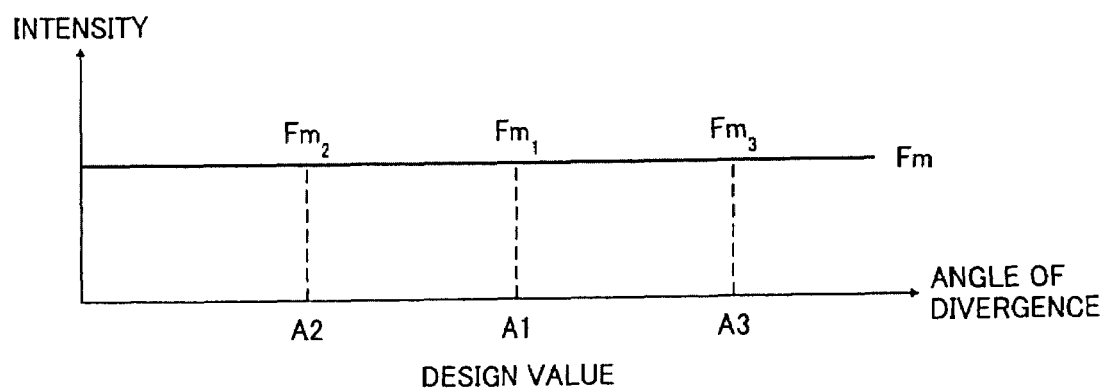
FIG. 12 is a graph of a relation between intensity of a light beam that passes through a second aperture of the second aperture plate and the angle of divergence.

However, in the first embodiment, the second aperture plate 26 disposed in the light path of the monitoring light beam reflected by the first aperture plate 23 shapes the monitoring light beam. As a result, as shown in FIG. 12, the light beam received by the photodiode 25 (light beam Fm, for example) has a substantially constant intensity similar to the intensity of the light beam Fs even if the angle of divergence of the light beam F0 varies.

Furthermore, the relations D3<D1 and D4>D2 between the first aperture of the first aperture plate 23 and the second aperture of the second aperture plate 26 ensure that a ratio of the intensity of the light beam Fs to the intensity of the light beam Fm is substantially constant even if the angle of divergence of the light beam F0 varies significantly.

The intensity (of the light beam Fm) received by the photodiode 25 can be increased by increasing the length D4 of the second aperture of the second aperture plate 26 along the sub-scanning direction.

Figure 13:
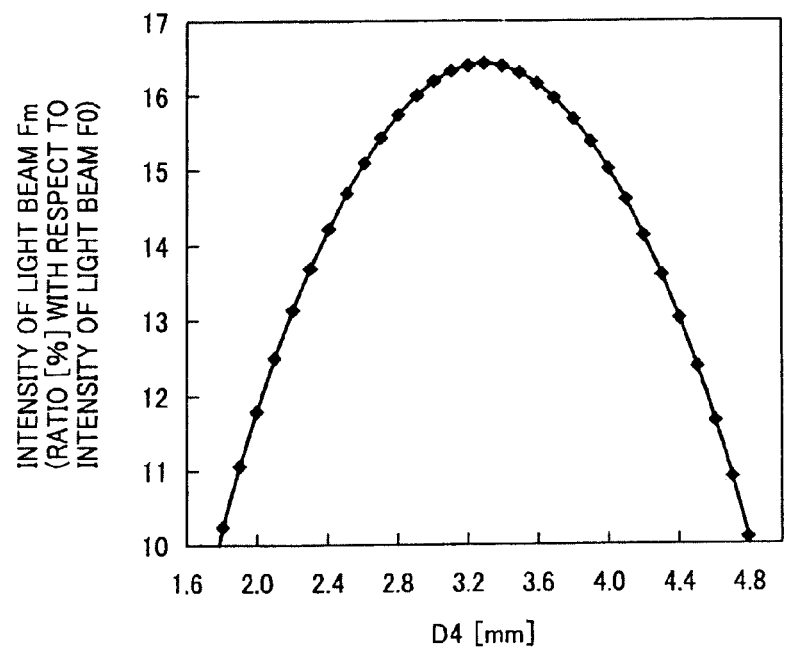
FIG. 13 is a graph of a relation between intensity of a light beam that passes through the second aperture and a length of the second aperture.

FIG. 13 is a graph of a relation between the length D4 and the intensity of the light beam Fm when the ratio of the intensity of the light beam Fs to the intensity of the light beam Fm is constant. The intensity increases with the increase in the length D4 up to a predetermined value. However, the intensity decreases when the length D4 exceeds the predetermined value. This indicates that, even if the ratio of the intensity of the light beam Fs to the intensity of the light beam Fm is constant, the length D3 must be reduced if the length D4 is made too large.

If the length D4 is in the range of 1.4 times to 3.7 times the length D2, the intensity of the light beam Fm exceeds 10% of the intensity of the light beam F0. For example, if the intensity of the light source 14 is 1 megawatts, the photodiode 25 receives a light beam of intensity of over 0.1 megawatts, so that the photodiode 25 can output signals with reduced signal-to-noise ratio and detect intensity accurately and without delay. To maximize the intensity of the light beam Fm, the lengths D3 and D4 in the first embodiment are set as 3.8 millimeters and 3.25 millimeters, respectively, but not thus limited.

Figure 14:
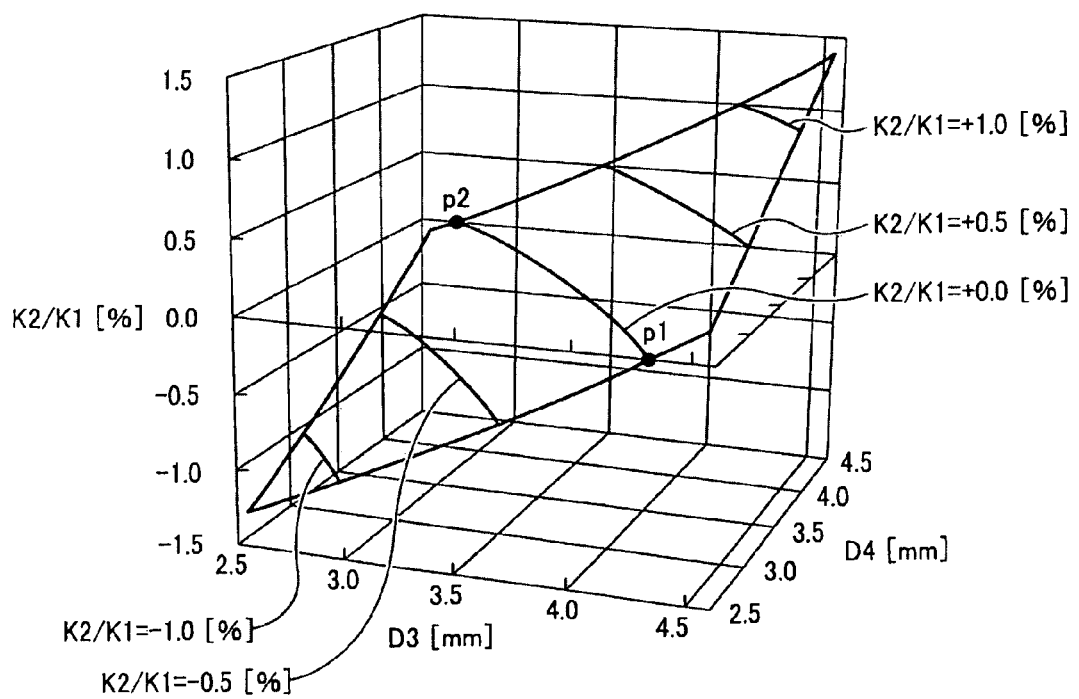
FIG. 14 is a graph of a relation between a ratio K2/K1 and lengths D3 and D4, where K1 and K2 represent ratios of intensity of light beams while D3 and D4 represent lengths of the second aperture.

FIG. 14 is a graph of a relation between the lengths D3 and D4 and a ratio K1/K2. K1 is a ratio of the intensity of the light beam Fs to the intensity of the light beam Fm when the light beam F0 has a predetermined angle of divergence (A1, for example). K2 is a ratio of the intensity of the light beam Fs to the intensity of the light beam Fm when the light beam F0 has an angle of divergence obtained by isotropically altering and angle of divergence A1 in both the main-scanning direction and the sub-scanning direction.

As can be surmised from FIG. 14, if the length D3 is kept constant and the length D4 is increased, the ratio K2/K1 increases. If the length D4 is kept constant and the length D3 is decreased, the ratio K2/K1 decreases. This relation between the lengths D3 and D4 and the ratio K2/K1 can be used to determine the combination of the lengths D3 and D4 required for obtaining 0% as K2/K1 ratio, that is, for obtaining a constant ratio of the intensity of the light beam Fs to the intensity of the light beam Fm even if the angle of divergence of the light beam varies. For example, as shown in FIG. 14, a curve obtained by connecting a point p1 (D3=4.3 millimeters and D4=2.5 millimeters) and a point p2 (D3=2.7 millimeters and D4=4.5 millimeters) satisfies K2/K1=0%. Normally, an intensity variation of 3% or more would produce images of uneven density. Therefore, it is preferable to keep the variation in the ratio K2/K1 to 3% or less. As described above, the variation in the intensity due to variation in the angle of divergence of the light beam F0 can be limited to within ±3%.

If the angle of divergence of the light beam emitted by the light source 14 varies isotropically such that the intensity of the light beam Fs changes from Ps to Ps+ΔPs and the intensity of the light beam Fm changes from Pm to Pm+ΔPm, a value of $\{(Ps+\Delta Ps)/(Pm+\Delta Pm)\}/(Ps/Pm)$ should preferably be between 0.97 and 1.03, including the limits.

Therefore, if the length D4 is within the range of 1.4 times to 3.7 times the length D2, including the limits, it can be ensured that the intensity received by the photodiode 25 is adequate, and the ratio of the intensity of the light beam Fs to the intensity of the light beam Fm can be kept substantially constant.

If the intensity of the light beam Fs remains constant even if the angle of divergence varies significantly, the intensity of the light beam Fm remains substantially constant. Therefore, if the intensity of the light beam F0 is controlled so that the photodiode 25 outputs signals at a predetermined constant level, a constant intensity of the light beam Fs can always be maintained.

The imaging lens 24 is disposed at a distance of 20 millimeters from the second aperture plate 26 in Q direction and condenses the monitoring light beam coming through the second aperture of the second aperture plate 26. The focal distance of the imaging lens 24 is 10 millimeters. A lateral magnification β of an optical system disposed between the light source 14 and the photodiode 25 is approximately 0.5.

The photodiode 25 is disposed at a distance of 10.6 millimeters from the imaging lens 24 in Q direction, and receives the monitoring light beam that comes from the imaging lens 24. Upon receiving the monitoring light beam, the photodiode 25 outputs signals (photoelectric conversion signals) proportionate to the intensity of the monitoring light beam received by the photodiode 25.

The light-receiving surface of the photodiode 25 is a square of 1.1-millimeter side lengths, and the photodiode 25 is set in such a way that the light beam falls in the vicinity of the central portion of the light-receiving surface.

If the light-receiving surface of the photodiode 25 has foreign particles adhering to it or has a scratch and when the light beam falls on that area of the light-receiving surface, the intensity of the light beam decreases significantly. As a result, the photodiode 25 cannot output signals accurately. However, the beam diameter on the light-receiving surface can be increased by placing the photodiode 25 a little away from the imaging lens 24 in Q direction. Thus, significant reduction in the intensity of the light beam received by the photodiode 25 can be prevented even in the presence of foreign particles or scratches on the light-receiving surface.

Figure 15:
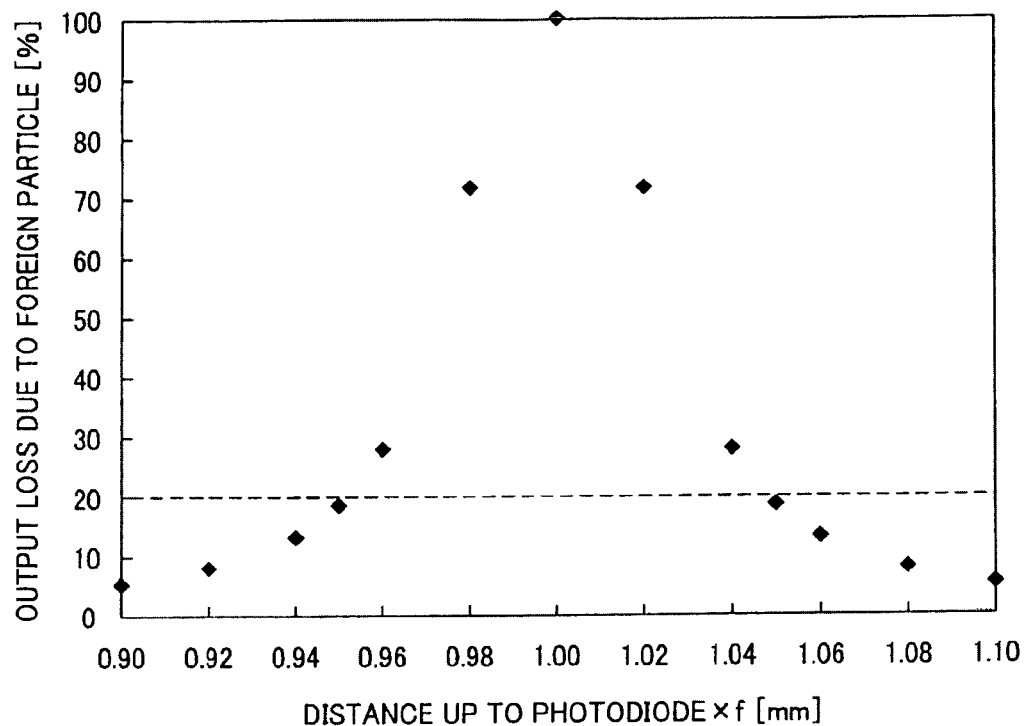
FIG. 15 is a graph of a relation between an output loss of a photodiode due to a foreign particle and a distance between an imaging lens and the photodiode.

FIG. 15 is a graph of a relation between a decrease in the output of the photodiode 25 and the distance between the imaging lens 24 and the photodiode 25 under the condition where a foreign particle (of the order of φ50 micrometers) visible to the naked eye is adhering to the central portion of the light-receiving surface. The reference symbol f in FIG. 5 indicates the focal length of the imaging lens 24.

As can be surmised from FIG. 15, even if a foreign particle of φ50 micrometers is adhering to the central portion of the light-receiving surface of the photodiode 25, if the distance between the imaging lens 24 and the photodiode 25 is either one of f×0.95 or less and f×1.05 or greater, the reduction in the output of the photodiode is 20% or less. These distance ranges are well within the range in which the light source 14 can be tested at the factory.

Therefore, the photodiode 25 in the first embodiment is set at a distance of f×1.06 from the imaging lens 24, but not thus limited.

Figure 16:
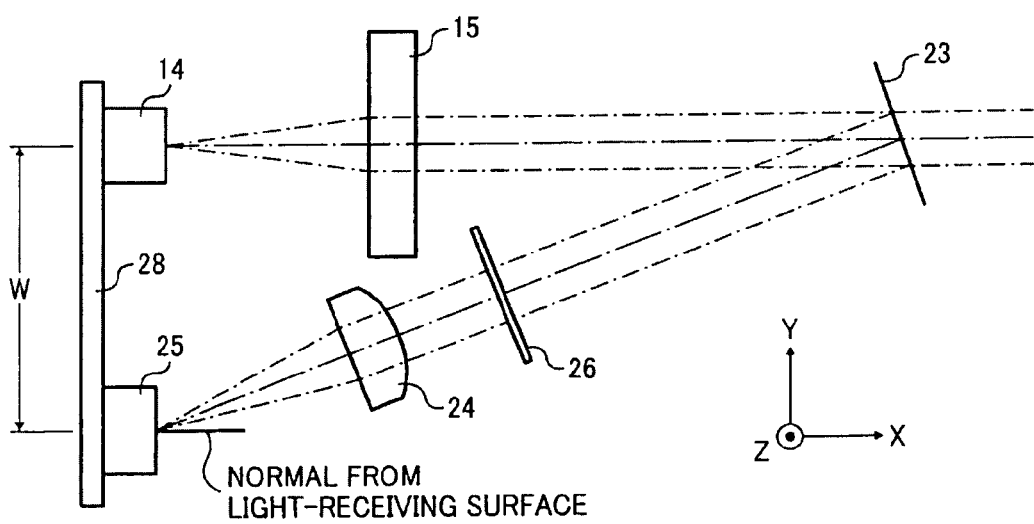
FIG. 16 is a schematic diagram for explaining how the light source and the photodiode are arranged on a single board.

If the monitoring light beam hits the light-receiving surface of the photodiode 25 perpendicularly, some of the light beam is likely to be reflected back toward the light source 14. Therefore, in the first embodiment, as shown in FIG. 16, the photodiode 25 is set in such a way that a normal from the light-receiving surface that receives the monitoring light beam is inclined with respect to a direction of incidence of the monitoring light beam. Specifically, the photodiode 25 is set so that the incident angle is 10 degree.

Because the lateral magnification β of the optical system disposed between the light source 14 and the photodiode 25 is approximately 0.5 and the length of the two-dimensional array 100 is 0.3 millimeter, the length of the two-dimensional array 100 projected in the lens would be 0.3 millimeter× 0.5=0.15 millimeter.

The sensitivity of the photodiode 25 varies depending on where the incident light hits the light-receiving surface. The incident light should preferably hit the vicinity of the central portion of the light-receiving surface for consistent sensitivity.

Figure 17:
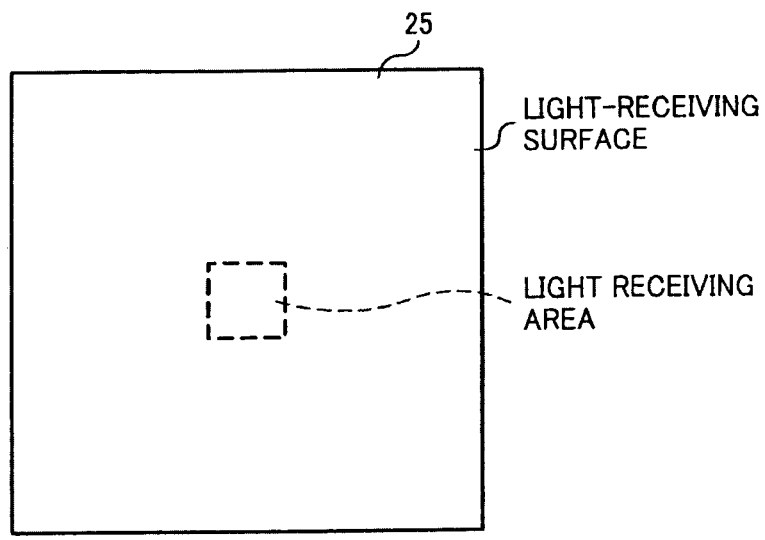
FIG. 17 is schematic diagram for explaining a relation between a light-receiving surface and a light receiving area of the photodiode.

In the first embodiment, as shown in FIG. 17, the light receiving area is at the central portion of the light-receiving surface, covering less than half the side length of 1.1 millimeters of the light-receiving surface. In other words, if the length of the two-dimensional array 100 is L, and the length of the photodiode 25 corresponding to the length of the two-dimensional array 100 is L', the relation expression $(L\times\beta)\leq(L'\times0.5)$ is satisfied, ensuring that the intensity of the light beam received by the photodiode 25 is constant.

Furthermore, the light source 14 and the photodiode 25 in the first embodiment are arranged on a single board 28, as shown in FIG. 16.

Figure 18:
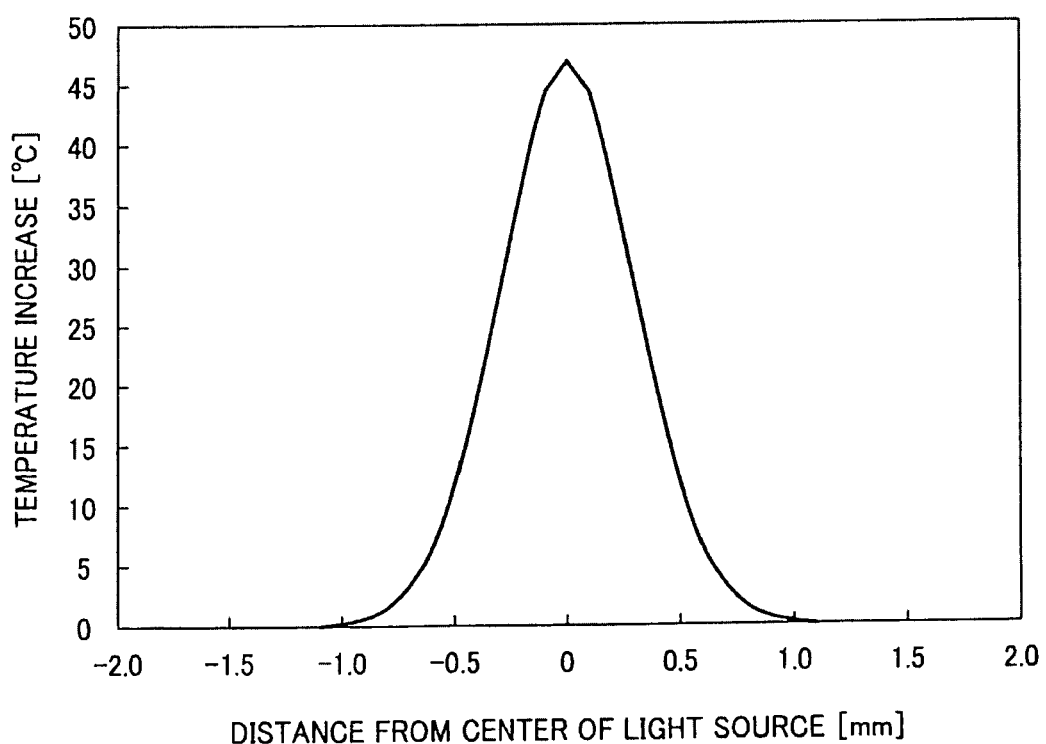
FIG. 18 is a graph of a relation between a distance from the center of the light source and a temperature rise at each position.

The sensitivity of the photodiode 25 also varies with temperatures and hence the photodiode 25 should preferably be placed away from any heat source. FIG. 18 is a graph of a relation between the distance from the center of the light source 14 and the rise in temperature at each position. It can be surmised from FIG. 18 that there is a temperature rise of about 50° C. at the center of the light source 14, substantially no temperature rise at a distance of 1 millimeter from the light source 14, and no temperature rise at all at a distance of 2 millimeters and beyond.

The distance (represented by the reference symbol W in FIG. 16) between the center of the light source 14 and the center of the photodiode 25 in the first embodiment is 7 millimeters due to the layout of the optical elements, but not thus limited.

The optical elements disposed in a light path between the first aperture plate 23 and the photodiode 25 are also called a monitoring optical system. In the first embodiment, the monitoring optical system includes the second aperture plate 26 and the imaging lens 24.

Figure 19:
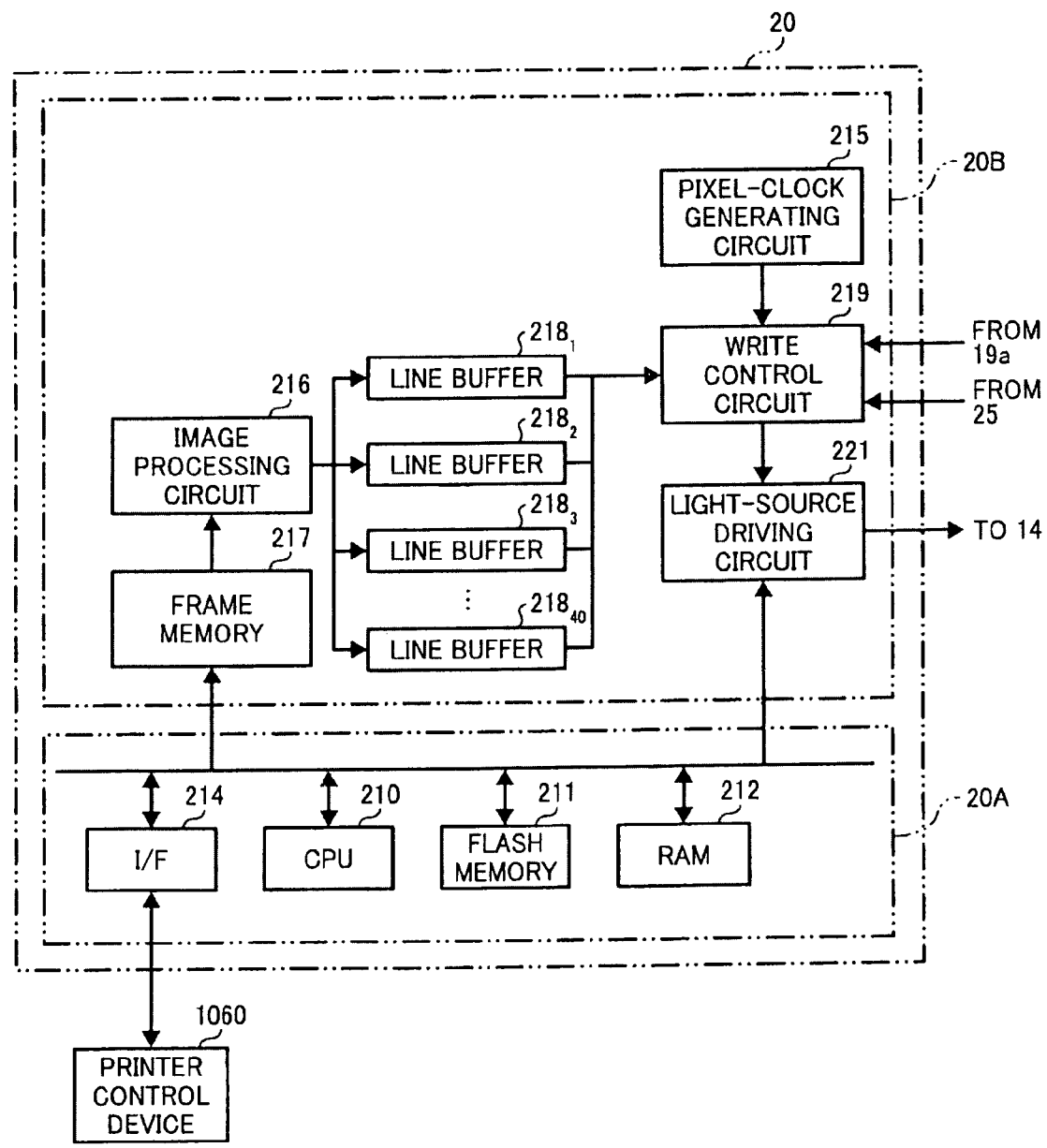
FIG. 19 is a block diagram of a scan control device.

FIG. 19 is a block diagram of the scan control device 20. The scan control device 20 includes a main control unit 20A and a drive control unit 20B.

The main control unit 20A includes a central processing unit (CPU) 210, a flash memory 211, a random access memory (RAM) 212, and an interface (I/F) 214.

The drive control unit 20B includes a pixel-clock generating circuit 215, an image processing circuit 216, a frame memory 217, line buffers $218_1$ to $218_{40}$, and a write control circuit 219. The drive control unit 20B is provided on the board 28 on which the light source 14 and the photodiode 25 are mounted.

The arrows shown in FIG. 19 represent the typical flow of signals or data and not how the functional blocks are connected to each other.

The pixel-clock generating circuit 215 generates pixel clock signals.

The frame memory 217 temporarily stores therein raster-expanded image data (hereinafter, "raster data") obtained by the CPU 210.

The image processing circuit 216 reads the raster data stored in the frame memory 217, performs a predetermined halftone process, creates dot data for each light-emitting unit, and outputs the dot data to corresponding one of the line buffers $218_1$ to $218_{40}$.

The write control circuit 219 determines the scanning start timing based on the output signals from the synchronous sensor 19a. At a timing synchronized with the scanning start timing, the write control circuit 219 reads the dot data of each light-emitting unit from the line buffers $218_1$ to $218_{40}$, and superimposes the dot data with the pixel clock signal from the pixel-clock generating circuit 215 in addition to creating independent modulation data for each of the light-emitting units. Furthermore, based on the output signal of the photodiode 25, the write control circuit 219 adjusts at a predetermined timing the driving current supplied to the light-emitting units in such a way that the intensity of the light beam passing through the first aperture of the first aperture plate 23 is maintained constant. In other words, the write control circuit 219 performs APC.

A light-source driving circuit 221 drives each of the light-emitting units v1 to v40 of the two-dimensional array 100 according to the modulation data created by the write control circuit 219.

The flash memory 211 stores therein various computer programs written as a code readable by the CPU 210, and data required by the computer programs.

The RAM 212 is a working memory.

The CPU 210 causes various processing according to the computer programs stored in the flash memory 211, and controls the optical scanning device 1010 as a whole.

The I/F 214 is a communication interface that controls a two-way communication between the optical scanning device 1010 and the printer control device 1060. The image data from the higher-level device is fed through the I/F 214.

Thus, a monitoring device in the optical scanning device 1010 according to the first embodiment includes the first aperture plate 23, the second aperture plate 26, the imaging lens 24, and the photodiode 25.

The light source 14, the coupling lens 15, and the monitoring device together form a light source device. The light beam Fs that output from the first aperture of the first aperture plate 23 is a light beam output by the light source device.

The processes performed by the CPU 210 by reading the computer programs can be partially or integrally implemented by hardware.

Thus, the monitoring device according to the first embodiment includes the first aperture plate 23, the second aperture plate 26, the imaging lens 24, and the photodiode 25. The first aperture plate 23 (an optical element that separates a light beam) is disposed in the light path of the light beam emitted by the two-dimensional array 100 and includes the first aperture through which a portion of the light beam having a maximum light intensity passes and the reflecting portion arranged around the first aperture such that the reflecting portion reflects a portion of the light beam as the monitoring light beam. The second aperture plate 26 (an aperture member) is disposed in the light path of the monitoring light beam reflected by the first aperture plate 23 and includes the second aperture that shapes the beam diameter of the monitoring light beam. The photodiode 25 (a light-receiving element) receives the light beam coming through the second aperture of the second aperture plate 26 via the imaging lens 24.

In the first embodiment, the length D1 of the first aperture of the first aperture plate 23 in the direction corresponding to the main-scanning direction (first direction) is longer than the length D2 in the direction corresponding to the sub-scanning direction (second direction, the length D3 of the second aperture of the second aperture plate 26 in the direction corresponding to the main-scanning direction is shorter than the length D1, and the length D4 of the second aperture of the second aperture plate 26 in the direction corresponding to the sub-scanning direction is longer than the length D2.

Figure 20:
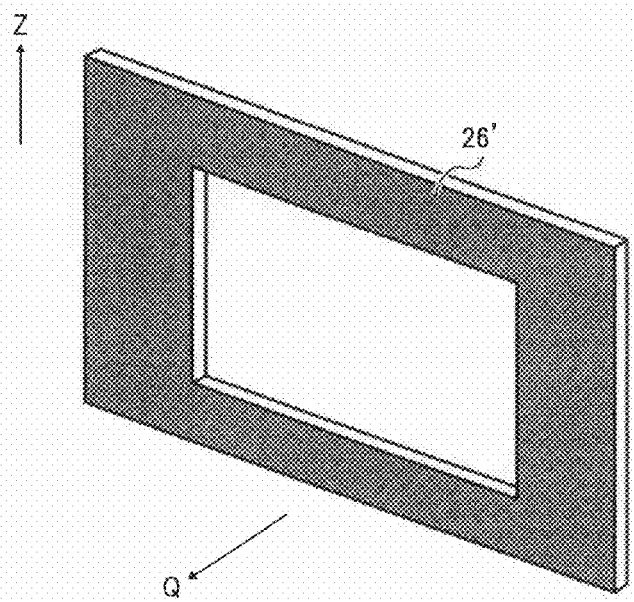
FIG. 20 is a schematic diagram of a modification of the second aperture plate shown in FIG. 2.

These mutual relations between the lengths D1 to D4 ensure that the ratio of the intensity of light beam Fs to the intensity of the light beam Fm is substantially constant irrespective of the angle of divergence. If the magnitude of variation of the angle of divergence is small, as shown in FIG. 20, the length D3 of the aperture of the second aperture plate 26 need not be shorter than the length D1, and the length D4 of the aperture of the second aperture need not be longer than the length D2.

Thus, the monitoring device according to the first embodiment can stabilize the intensity variation and accurately detect the intensity of the light beam emitted by the two-dimensional array 100.

The light source device according to the first embodiment includes the monitoring device that stabilizes the intensity variation and accurately detects the intensity of the light beam emitted by the two-dimensional array 100, and therefore outputs a stabilized light beam.

The optical scanning device 1010 according to the first embodiment includes the light source device that outputs a stabilized light beam, and therefore performs a precise and stabilized optical scanning of the surface of the photosensitive drum 1030.

The laser printer 1000 according to the first embodiment includes the optical scanning device 1010 that performs precise optical scanning of the surface of the photosensitive drum 1030, and therefore produces high quality images.

In the first embodiment, the length D1 can be the length in the sub-scanning direction, and the length D2 can be the length in the main-scanning direction, instead of those described above. Similarly, the length D3 can be the length in the sub-scanning direction, and the length D4 can be the length in the main-scanning direction, instead of those described above.

The number of light-emitting units in the light source 14 is 40 in the first embodiment, but need not be limited to this number.

Instead of the two-dimensional array 100, a one-dimensional array in which a plurality light-emitting units are arranged one-dimensionally can be used.

The laser printer 1000 is presented as the image forming apparatus in the first embodiment, but the image forming apparatus need not be restricted to laser printers. Any image forming apparatus can be provided with the optical scanning device 1010 to produce high quality images.

The image forming apparatus can be one that directly irradiates a medium (such as a sheet of paper) on which the color image is to be produced with the laser beam.

An image forming apparatus can be used in which a silver halide film serves as an image carrying member. In this case, the latent image is formed by optical scanning on the silver halide film. The latent image on the silver halide film can be converted to a visible image by subjecting the silver halide film to a process equivalent to the developing process of a regular silver halide photographic process, and the visible image can be transferred to a printing paper by a process equivalent to a printing process of the regular silver halide photographic process. Such an image forming apparatus can be implemented as a photoengraving device, or a laser beam writing system that produces CT scan images, etc.

An optical scanning device supporting color images can be used in a full-color image forming apparatus to produce high quality images at high speeds.

Figure 21:
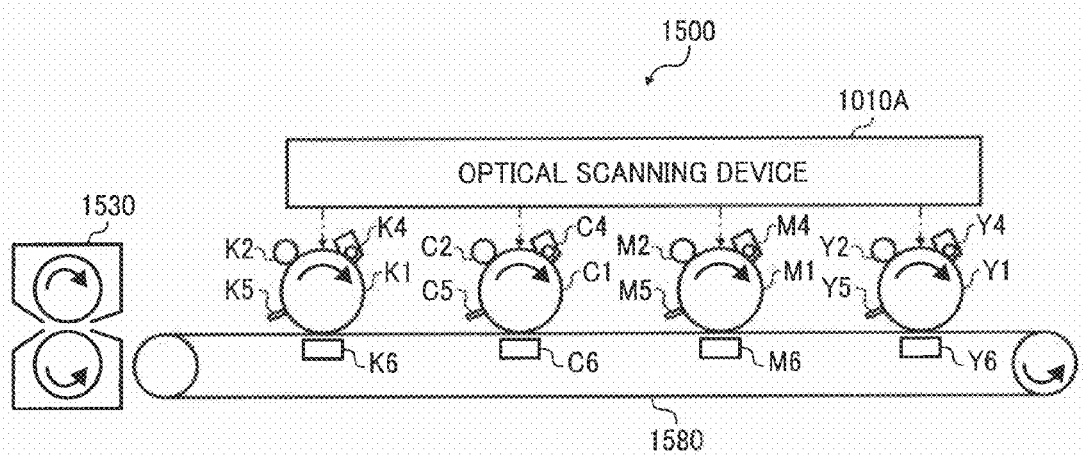
FIG. 21 is a schematic diagram of a tandem color image forming apparatus.

For example, the image forming apparatus can be a tandem color image forming apparatus 1500 shown in FIG. 21, provided with a plurality of photosensitive drums for forming color images. The tandem color image forming apparatus 1500 includes photosensitive drums K1, C1, M1, Y1, charging devices K2, C2, M2, Y2, developing device K4, C4, M4, Y4, cleaning units K5, C5, M5, Y5, and transfer charging units K6, C6, M6, Y6 for each of a black toner (K), a cyan toner (C), a magenta toner (M), and a yellow toner (Y). The tandem color image forming apparatus 1500 further includes an optical scanning device 1010A, a transfer belt 1580, and a fixing unit 1530.

Each of the photosensitive drums K1, C1, M1, Y1 rotates in the direction of arrows shown in FIG. 21. Each set of the charging device, the developing device, the transfer charging unit, and the cleaning unit is disposed in the vicinity of the corresponding photosensitive drum in the mentioned order along the rotation direction of the photosensitive drum for each color. Each of the charging devices K2, C2, M2, Y2 uniformly charges the surface of its corresponding photosensitive drum. The optical scanning device 1010A irradiates the uniformly charged surface of each of the photosensitive drums K1, C1, M1, Y1 with a light to form a electrostatic latent image. Each of the developing devices K4, C4, M4, Y4 converts the electrostatic latent image on the surface of its corresponding photosensitive drum to a toner image of the corresponding color. Each of the transfer charging units K6, C6, M6, Y6 transfers the corresponding toner images to a recording paper. The fixing unit 1530 fixes the image to the recording paper. Each of the cleaning units K5, C5, M5, Y5 cleans the surface of its corresponding photosensitive drum after the image is fixed.

The optical scanning device 1010A includes, although not shown, a light source device, a cylindrical lens, a scanning optical system, and a synchronous sensor for each of the black toner, the cyan toner, the magenta toner, and the yellow toner, and a polygon mirror.

Each of the light source devices is functionally and structurally similar to the light source device according to the first embodiment, and includes the monitoring device structurally and functionally similar to the monitoring device according to the first embodiment.

The light beam output from each of the light source device is converged as a light spot on the surface of the corresponding photosensitive drum by the respective scanning optical elements.

Of the light beam deflected by the polygon mirror 13 and output from the scanning optical system, a portion of the light beam that is not used for image formation passes through the synchronous mirror 19b and is directed toward the synchronous sensor 19a as a synchronous light beam. The synchronous sensor 19a outputs signals (photoelectric conversion signals) proportionate to the intensity of the received light beam.

Each of the light source devices, being structurally and functionally similar to the light source according to the first embodiment, therefore outputs a stabilized light beam. Consequently, the optical scanning device 1010A performs a precise and stabilized optical scanning of the surface of the photosensitive drum.

The tandem color image forming apparatus 1500 is therefore able to form stabilized high quality images.

Color drift is a common occurrence in a tandem color image forming apparatus. However, the correction precision of color drift can be improved by selecting an appropriate light-emitting unit that radiates light.

Instead of the optical scanning device 1010A, an optical scanning device can be individually provided for each of the toner colors of black, cyan, magenta, and yellow in the tandem color image forming apparatus 1500. In this case, each of the optical scanning devices should essentially have a light source device that is identical to the light source device according to the first embodiment.

According to one aspect of the present invention, even if the actual angle of divergence of the light beam emitted by a light source differs from the angle of divergence at the time of design, the intensity variation of the light beam passing through the aperture of the optical element and the intensity variation of the light beam of the monitoring light beam received by the light-receiving element can be kept substantially the same. Therefore, the intensity variations of the light beam emitted by the light source can be stabilized and the intensity of the light beam can be detected accurately.

According to another aspect of the present invention, a stabilized light beam is output.

According to still another aspect of the present invention, a stabilized and accurate scanning of a scanning surface can be carried out.

According to still another aspect of the present invention, stabilized, high quality images can be formed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A monitoring device that monitors intensity of a light beam emitted by a light source, the monitoring device comprising:

an optical element having a first aperture arranged such that a first portion of the light beam having maximum intensity passes through a substantial center of the first aperture, and a reflecting portion arranged around the first aperture such that the reflecting portion reflects a second portion of the light beam as a monitoring light beam to be monitored;

an aperture member having a second aperture that shapes a beam diameter of the monitoring light beam; and a light-receiving element that receives the monitoring light beam coming through the second aperture.

2. The monitoring device according to claim 1, wherein the first aperture has a first length in a first direction and a second length in a second direction perpendicular to the first direction such that the first length is longer than the second length, and the second aperture has a third length in the first direction and a fourth length in the second direction such that the third length is shorter than the first length and the fourth length is longer than the second length.

3. The monitoring device according to claim 2, wherein the fourth length is from 1.4 times to 3.7 times longer than the second length, including limits.

4. The monitoring device according to claim 1, wherein when an angle of divergence of the light beam changes isotropically such that intensity Ps of the light beam passing through the first aperture changes to Ps+ΔPs and intensity Pm of the light beam passing through the second aperture changes to Pm+ΔPm, a value of $\{(Ps+\Delta Ps)/(Pm+\Delta Pm)\}/(Ps/Pm)$ is between 0.97 and 1.03, including limits.

5. The monitoring device according to claim 1, further comprising a condensing lens that condenses the monitoring light beam, wherein a light path length between the condensing lens and the light-receiving element is either one of 0.95 or less times and 1.05 or greater times a focal distance of the condensing lens.

6. The monitoring device according to claim 1, wherein a normal at a light-receiving surface of the light-receiving element is inclined with respect to a direction of incidence of the monitoring light beam.

7. A light source device comprising:

a light source; and a monitoring device that monitors intensity of a light beam emitted by the light source, the monitoring device including an optical element having a first aperture arranged such that a first portion of the light beam having maximum intensity passes through a substantial center of the first aperture, and a reflecting portion arranged around the first aperture such that the reflecting portion reflects a second portion of the light beam as a monitoring light beam to be monitored;

an aperture member having a second aperture that shapes a beam diameter of the monitoring light beam; and a light-receiving element that receives the monitoring light beam coming through the second aperture, wherein the first portion of the light beam is output to an external.

8. The light source device according to claim 7, further comprising a coupling lens that is arranged between the light source and the monitoring device, and converts the light beam into a substantially parallel beam, wherein the aperture member is arranged optically in the vicinity of a focal point of the coupling lens.

9. The light source device according to claim 7, wherein the light source has a plurality of light-emitting units.

10. The light source device according to claim 9, wherein the light-emitting units are arranged in a two-dimensional array, and the monitoring device further includes a monitoring optical system that guides the light beam coming through the second aperture toward the light-receiving element so that a relational expression of $(L \times \beta) \leq (L' \times 0.5)$ is satisfied, where L is a length of the two-dimensional array, L' is a length of the light-receiving element in a direction corresponding to L, and $\beta$ is a lateral magnification of an optical system disposed between the light source and the light-receiving element.

11. The light source device according to claim 7, wherein the light source is a vertical cavity surface emitting laser.

12. The light source device according to claim 7, wherein the light source and the light-receiving element are arranged at least 2 millimeters apart from each other on a single board.

13. The light source device according to claim 12, wherein a driving circuit of the light source is mounted on the board.

14. An optical scanning device that scans a scanning surface with a light beam, the optical scanning device comprising:

a light source device including a light source; and a monitoring device that monitors intensity of a light beam emitted by the light source, the monitoring device including an optical element having a first aperture arranged such that a first portion of the light beam having maximum intensity passes through a substantial center of the first aperture, and a reflecting portion arranged around the first aperture such that the reflecting portion reflects a second portion of the light beam as a monitoring light beam to be monitored;

an aperture member having a second aperture that shapes a beam diameter of the monitoring light beam; and a light-receiving element that receives the monitoring light beam coming through the second aperture, wherein the first portion of the light beam is output to an external;

a deflector that deflects a light beam emitted by the light source device; and a scanning optical system that condenses a light beam deflected by the deflector on the scanning surface.

15. An image forming apparatus comprising:

at least one image carrying member; and at least one optical scanning device according to claim 14, wherein the scanning device scans the image carrying member with a light beam based on image data.

16. The image forming apparatus according to claim 15, wherein the image data is a full-color image data.

* * * * *